United States Patent [19]
Katz

[11] Patent Number: 5,319,608
[45] Date of Patent: Jun. 7, 1994

[54] METHOD AND SYSTEM FOR IDENTIFYING THE ONSET OF A TURBULENT BOUNDARY LAYER INDUCED BY A BODY MOVING THROUGH A FLUID MEDIUM

[75] Inventor: Richard A. Katz, East Lyme, Conn.

[73] Assignee: The United States of America as represented by the Secretary of the Navy, Washington, D.C.

[21] Appl. No.: 117,514

[22] Filed: Sep. 2, 1993

[51] Int. Cl.$^5$ .............................................. B64C 23/00
[52] U.S. Cl. ......................................... 367/1; 244/204
[58] Field of Search ............... 367/1; 114/67 A, 67 R; 244/204, 130

[56]  References Cited

U.S. PATENT DOCUMENTS

| | | | |
|---|---|---|---|
| 4,363,991 | 12/1982 | Edelman | 310/316 |
| 4,516,747 | 5/1985 | Lurz | 244/204 |
| 4,741,498 | 5/1988 | Gerhardt | 244/204 |
| 4,802,642 | 2/1989 | Mangiarotty | 244/204 |
| 4,932,610 | 6/1990 | Maestrello | 244/204 |

Primary Examiner—Daniel T. Pihulic
Attorney, Agent, or Firm—Michael J. McGowan; Prithivi C. Lall; Michael F. Oglo

[57] ABSTRACT

A method of detect the onset of turbulence in connection with a body moving through a fluid medium. First, the body is supplied with sensors each for generating a signal suitable for measuring amplitude of pressure fluctuations of the medium proximate a region of said sidewall of the body in at least a region of the body in which turbulence is expected to occur. During a reference stage during which the body moves through the fluid medium when it is known that turbulence is occurring around at least a portion of said body, the sensors each generate reference temporal pressure data representing fluctuations in pressure of the fluid medium around said body. In response to reference temporal pressure data generated by sensors in a turbulence zone at which turbulence is occurring and sensors in a transition zone between the turbulence zone and a laminar flow zone, a method-of-delay phase portrait is generated for each of a progression of selected delay intervals. These operations are repeated during an operational stage, and phase portraits generated during the operational stage are compared to phase portraits in response to the reference temporal pressure data from the transitional zone and the turbulence zone, for corresponding ones of said selected delay intervals,, and a determination of the onset of turbulence is made in response to such comparison.

7 Claims, 8 Drawing Sheets

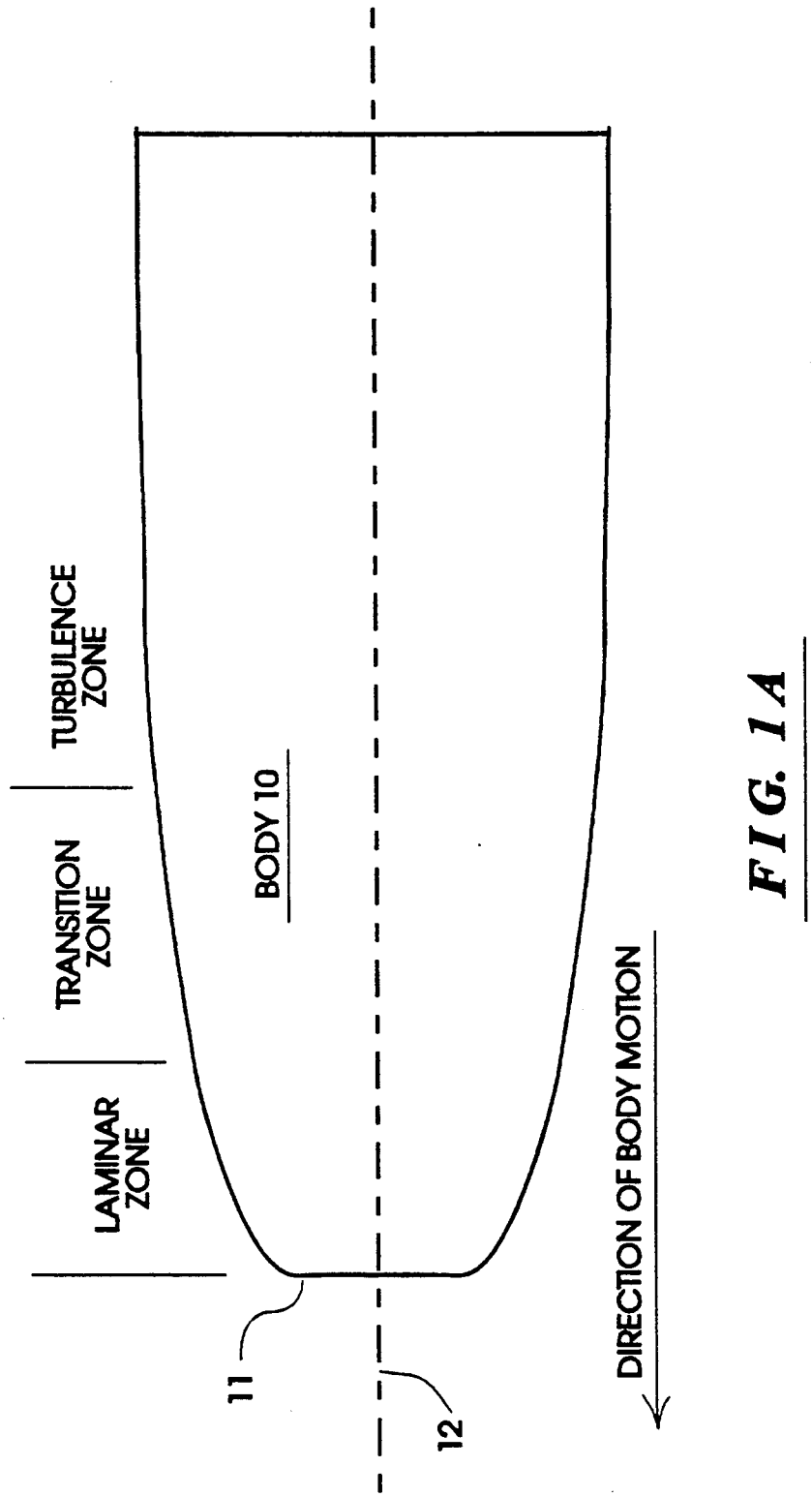

FIGURE 2

100. RECORD SET OF REFERENCE TEMPORAL PRESSURE DATA ALONG BODY WHEN FULL TURBULENCE IS KNOWN

↓

101. FILTER REFERENCE TEMPORAL PRESSURE DATA TO REMOVE FREQUENCY COMPONENTS OUTSIDE OF T-S REGION

↓

102. DERIVE METHODS-OF-DELAY PHASE PORTRAIT EMPLOYING MULTIPLES OF AN ARBITRARILY-CHOSEN TIME DELAY

103. IN OPERATION, RECORD EXPERIMENTAL SET OF OPERATIONAL TEMPORAL PRESSURE DATA AT SAME POSITIONS ALONG BODY WHEN ONSET OF TURBULENCE IS SUSPECTED

↓

104. FILTER THE OPERATIONAL TEMPORAL PRESSURE DATA TO REMOVE FREQUENCY COMPONENTS OUTSIDE OF T-S REGION

↓

105. DERIVE METHODS-OF-DELAY PHASE PORTRAIT OF OPERATIONAL TEMPORAL PRESSURE DATA EMPLOYING MULTIPLES OF SAME ARBITRARILY-CHOSEN TIME DELAY AS WAS USED IN CONNECTION WITH REFERENCE DATA

↓

106. BASED ON COMPARISON OF REFERENCE AND OPERATIONAL PHASE PORTRAITS, IDENTIFY ONSET OF TURBULENCE FROM SIMILARITIES IN SHAPE OF PHASE PORTRAITS OF CORRESPONDING TIME DELAYS

METHOD AND SYSTEM FOR IDENTIFYING THE ONSET OF A TURBULENT BOUNDARY LAYER INDUCED BY A BODY MOVING THROUGH A FLUID MEDIUM

STATEMENT OF GOVERNMENT INTEREST

The invention described herein may be manufactured by or for the Government of the United States of America for Governmental purposes without the payment of any royalties thereon or therefor.

CROSS-REFERENCE TO RELATED PATENT APPLICATIONS

The instant applications is related to two-co-pending U.S. Patent Applications entitled METHOD AND SYSTEM FOR SUPPRESSING NOISE INDUCED IN A FLUID MEDIUM BY A BODY MOVING THERETHROUGH U.S. patent application Ser. No. 117,513 filed on Sep. 2, 1993 (Navy Case No. 75551; and METHOD AND SYSTEM FOR REDUCING DRAG ON A BODY MOVING THROUGH A FLUID MEDIUM U.S. patent application Ser. No. 117,512 filed on Sep. 2, 1993 (Navy Case No. 75552), both by the same inventor and filed on the same date as this patent application.

BACKGROUND OF THE INVENTION (1) Field of the Invention

The invention is generally related to the field of signal processing, and more specifically to the determination of the onset of turbulence in connection with a body moving through a fluid medium.

(2) Description of the Prior Art

The boundary layer flow over a body which has an axisymmetric exterior surface moving through a stationary fluid, in which the motion is steady and directed parallel to the longitudinal axis of the body, may be characterized by three spatially separated, but somewhat over-lapping, flow zones. These zones may be described as a laminar zone, a transitional zone and a turbulent zone. In the laminar zone, which is generally located toward the leading edge of the body, there are no appreciable disturbances of the pressure of the fluid on the surface of the body, and hence any measured pressure fluctuations within this zone are appreciably negligible. As the flow develops downstream of the leading edge of the body, it enters into the transition zone. The transition zone evolves from the latter stages of the laminar flow, where infinitesimal, linear wavelike disturbances, so-called Tollmien-Schlichting (T-S) waves, develop and begin to amplify both temporally and spatially with distance downstream of the leading edge of the body. The position along the wall at which small disturbance waves begin to amplify is related to both the shape and size of the body, as well as inertial characteristics of the flow of the medium in the vicinity of the wall. A re9ion of decreasing velocity (or increasing pressure) of the fluid relative to the surface of the body downstream of the leading edge of the body marks the beginning of a zone where an adverse pressure gradient sets in. This adverse pressure gradient has a destabilizing effect. At or shortly downstream of this position, T-S disturbance waves would be expected to start to grow.

The amplitude of the T-S waves becomes larger as they convect downstream, and as a result their evolution becomes nonlinear and turbulent bursting is observed. The bursts initially are local and occur intermittently over each point over this portion of the surface of the body. The number of bursts per unit time increases with distance along the surface from the leading edge of the body. Downstream, the bursting finally coalesces in such a way that the flow reaches a fully turbulent state. The position along the wall where bursting fully coalesces is the dividing line between the end of the transitional zone and the start of the turbulent zone.

Nonlinear coupling of energetic modes in the spectra of fluctuations in the velocity of the medium proximate the sidewall of the body, or of fluctuations in the pressure exerted by the medium on the sidewall of the body following T-S wave amplification. The nonlinear nature of the transition produces a temporal power spectrum of frequencies of the T-S waves and combinations of the sums and differences of the respective frequencies. In the time domain, the time scales of interest are the reciprocals of the associated T-S frequencies. These principal time scales are characterized by a value corresponding to the wavelengths of the T-S waves divided by their convective velocities.

SUMMARY OF THE INVENTION

The invention provides a new and improved method of predicting the dynamics of a wall-bounded shear flow of a fluid along an axisymmetric body exhibiting steady motion through the fluid.

In brief summary, the method in accordance with the invention detects the onset of turbulence in connection with a body moving through a fluid medium. First, the body is supplied with sensors each for generating a signal suitable for measuring amplitude of pressure fluctuations of the medium proximate a region of said sidewall of the body in at least a region of the body in which turbulence is expected to occur. During a reference stage during which the body moves through the fluid medium when it is known that turbulence is occurring around at least a portion of said body, the sensors each generate reference temporal pressure data representing fluctuations in pressure of the fluid medium around said body. In response to reference temporal pressure data generated by sensors in a turbulence zone at which turbulence is occurring and sensors in a transition zone between the turbulence zone and a laminar flow zone, a method-of-delay phase portrait is generated for each of a progression of selected delay intervals. During an operational stage, during which the body moves through the fluid medium, the sensors each generate operational temporal pressure data representing fluctuations in pressure of the fluid medium around said body. In response to the operational temporal pressure data, a method-of-delay phase portrait is generated for each of a progression of selected delay intervals. The phase portraits generated in response to the operational temporal pressure data during the operational stage are compared to phase portraits generated in response to the reference temporal pressure data from the transitional zone and the turbulence zone, for corresponding ones of said selected delay intervals. This is done to determine whether the phase portraits generated in response to the operational temporal pressure data have selected characteristics present in the phase portraits generated in response to the reference temporal pressure data from the transitional zone and the turbulence zone. In turn, a determination of the onset of turbulence is made in response to such comparison.

In another aspect, the invention provides a system for detecting the onset of turbulence in connection with a body moving through a fluid medium. The body is supplied with sensors each for generating a signal suitable for measuring amplitude of pressure fluctuations of the medium proximate a region of said sidewall of the body in at least a region of the body in which turbulence is expected to occur. During a reference stage during which the body moves through the fluid medium when it is known that turbulence is occurring around at least a portion of said body, the sensors each generate reference temporal pressure data representing fluctuations in pressure of the fluid medium around said body. In response to reference temporal pressure data generated by sensors in a turbulence zone at which turbulence is occurring and sensors in a transition zone between the turbulence zone and a laminar flow zone, means generate a method-of-delay phase portrait for each of a progression of selected delay intervals. During an operational stage, during which the body moves through the fluid medium, the sensors each generate operational temporal pressure data representing fluctuations in pressure of the fluid medium around said body. In response to the operational temporal pressure data, means generate a method-of-delay phase portrait for each of a progression of selected delay intervals. Comparators compare the phase portraits generated in response to the operational temporal pressure data during the operational stage to phase portraits generated in response to the reference temporal pressure data from the transitional zone and the turbulence zone, for corresponding ones of said selected delay intervals, to determine whether the phase portraits generated in response to the operational temporal pressure data have selected characteristics present in the phase portraits generated in response to the reference temporal pressure data from the transitional zone and the turbulence zone, with the comparator further making a determination of the onset of turbulence is made in response to such comparison.

In one embodiment, the reference temporal pressure data and operational temporal pressure data are low-pass filtered prior to generation of the phase portraits. In that operation, the data generated by each sensor over a selected time window is Fouriertransformed to 9enerate power spectra, and an inverse-Fourier transform is applied to the Fourier coefficients associated with frequencies below a selected cut-off frequency, the result being used in generating the respective phase portraits. In addition, further indicia of the turbulence state of the medium is generated from the power spectra generated during both the reference stage and the operational stage.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. IA is a diagram of an axisymmetric body with which the inventive method is used.

FIG. 2 is a flow chart illustrating the new method in accordance with the invention;

DETAILED DESCRIPTION OF THE PREFERRED EMBODIMENT

Figure 1B:
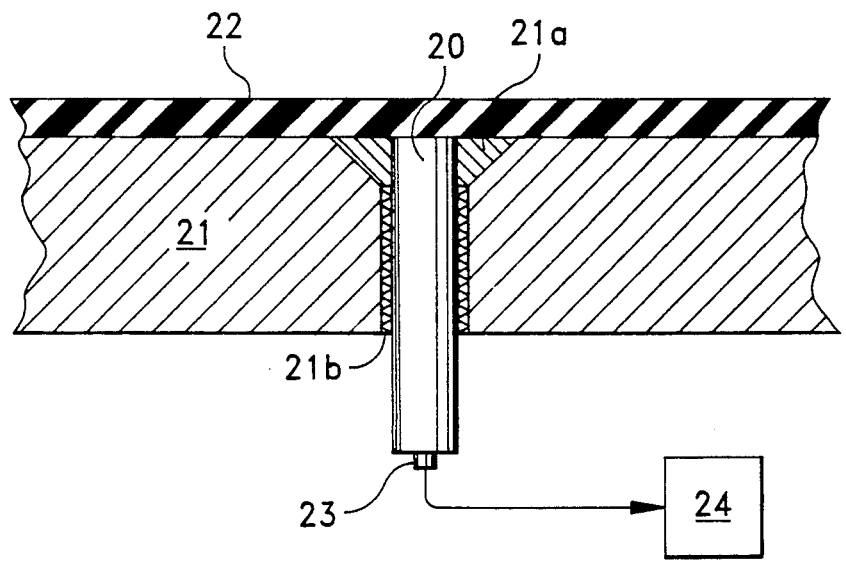
FIG. 1B is a diagram of a pressure sensor mounted on the body which is used to gather data used in practicing the method.

Prior to describing the new method, it would be helpful to describe an axisymmetric body with which the invention is used. FIG. 1A is a diagram of such a body 10, in particular representing the leading edge 11 of the body 10 and a portion of the body 10 downstream of the leading edge. The body 10 moves through a fluid medium (not shown) along a direction parallel to an axis 12, around which the body 10 is symmetric. As shown in FIG. 1A, flow of the medium around the body is generally laminar in a zone proximate the leading edge 11. Downstream of the laminar zone is a transition zone where Tollmein-Schichting (T-S) waves, which begin near the border between the laminar zone and the transition zone, tend to grow in amplitude according to a growth characteristic which is typically exponential. The waves represent fluctuations in pressure of the medium against the sidewall of the body 10 at points in the transition zone. In the transition zone, the waves are generally well defined combinations of particular frequencies which may depend on a number of variables, including the viscosity of the fluid forming the medium, the geometry (the particular size and shape) of the body 10, and the speed of the body 10 through the medium. The waves become fully turbulent, exhibiting a broadband spectrum of frequencies in the pressure fluctuations around the body, in a turbulence zone located downstream of the transition zone.

In practicing the method, pressure sensors are mounted in the sidewall of the body 10, one of which, namely, sensor 20, is shown mounted in the sidewall in FIG. IB. In one embodiment, the pressure sensor 20 is of the piezoelectric type having a cylindrical shape. The senso 20 is inserted in and bonded to an opening in the sidewall 21. The exterior end of the opening through sidewall 21 is provided with an inwardly tapered stainless steel grommet 21a which is in direct contact with sensor 20. An insert sleeve 21b of a suitable packing material is bonded within the opening through sidewall 21 and extends from the exterior end of grommet 21 to the interior end of the opening through sidewall 21. An elastomeric covering 22 extends over sidewall 22 and over the end face of pressure sensor 20. A microdot connector 23 on the pressure sensor 20 facilitates connection of the pressure sensor 20 to data processing equipment 24 which practices the method. In one embodiment, the sensors are mounted in rows along the length of the body 10, the rows being parallel to the axis 12 and separated around the circumference of the body 10 by approximately ninety degrees. The pressure sensors 20 in each row are separated by a uniform separation, approximately two inches in one embodiment. As between rows, the sensors 20 are staggered to preclude mutual interference between sensors, yet provide minimal separation alon9 the axis 12, so that a full set of measurements can be obtained from the early transition zone (that is, the portion of the transition zon proximate the laminar zone) fully into the turbulence zone. In one embodiment, the rows are staggered so that the positions of the pressure sensors 20 in rows on opposite sides of the body 10 are displaced by approximately one-half inch, and pressure sensors in proximate rows along body 10 are displaced by approximately one-quarter inch. 4. With this background, the method for detecting the onset of turbulence will be described in connection with FIGS. 2 through 5B. With reference initially to FIG. 2, the method is generally performed in two stages, namely, a reference stage, comprising steps 100 through 102, and an operational stage, comprising steps 103 through 106. In the reference stage, reference data is collected using the body 10 when turbulence is known to be taking place, and processed to produce graphical displays or numerically computed values of the processed data taken from the transitional zone and from the turbulence zone. In this way, differences between displays of processed data taken from the transitional zone and those taken from the turbulence zone can be identified. In addition, characteristics of the displays of processed data taken from the turbulence zone can also be identified. In the operational stage, operational data is collected, processed and displayed in a manner similar to the reference stage, and a determination is made as to whether turbulence is developing along the body 10 based on a visual comparison between corresponding displays of the processed data obtained during the operational stage and the reference stage, or alternatively the comparison may be numerically computed. The operations performed during the operational stage may be performed continually, to continually provide updated information as to the state of turbulence around the body 10.

More specifically, during the reference stage, the body 10 is moved through the fluid medium in a direction parallel to its axis 12. During operations performed in the reference stage, movement of the body 10 is such that a turbulence zone is developed at some point along the body 10, so that all three zones described above, including the laminar zone, the transition zone and the turbulence zone are present along the body 10 from the leading edge 11 in the downstream direction along the axis 12. During such movement, fluctuations in the pressure of the fluid against the sidewall of the body 10 is sensed by the various sensors 20 positioned therealong, and the amplitude of the pressure fluctuations is recorded digitally at successive points in time to provide pressure amplitude data values p(t) (step 100). The pressure amplitude data values p(t) recorded during step 100 are processed to generate both a temporal power spectrum (step 101) and phase portraits (step 102) for each sensor. The temporal power spectrum indicates the amplitude of various frequencies in the variations and fluctuations in pressure as sensed by the particular sensor 20. The phase portraits, generally, provide a visual display or numerically computed indication of the degree of correlation of phases of the variations and fluctuations in pressure as sensed by the sensor 20, and thus provides a visual indication of whether a turbulence zone is present along the body 10.

In particular, in step 101, a power spectrum is generated for each sensor. The power spectrum corresponds to the Fourier transform of the pressure amplitude data values, and, for each sequence $p(t_n)$ (n=1, 2, ... N) of pressure amplitude data values for "N" successive points in time, the Fourier transform is $$P(\sigma_m) = (1/N) \Sigma p(t_n) \exp(2i\pi nm/n) \quad (Eqn. 1)$$

(sum taken over "n" from 1 to N, that is, for each pressure amplitude data value in the sequence) where each $P(\sigma_m)$ represents a Fourier coefficient, and $$\sigma_m = m(2\pi/T), \quad (Eqn. 2)$$

where T it the total time along which the sequence $p(t_n)$ was taken. In one particular embodiment, the Fourier transform is performed using a conventional fast Fourier transform (FFT) operation. The spectrum values are normalized, and the result is windowed and smoothed in a conventional manner.

Figure 3A:
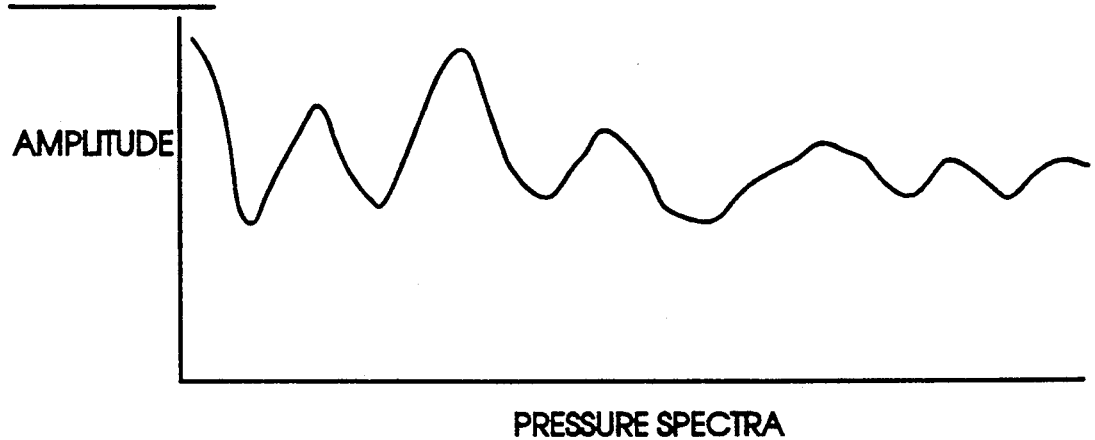
FIGS. 3A through 3F are a series of curves depicting pressure spectra values as a function of sensor location in a series of sensors successively located in the downstream direction along the axisymmetric body of FIG. 1.
Figure 3B:
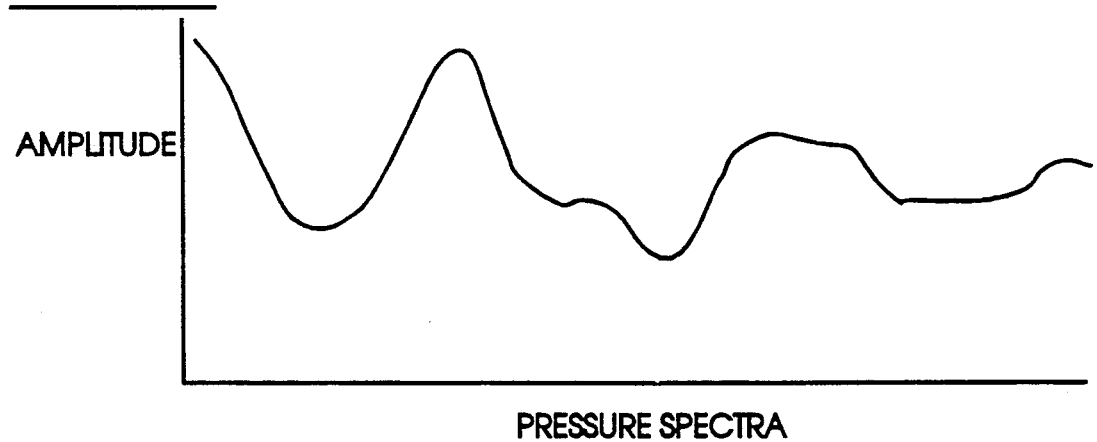
Figure 3C:
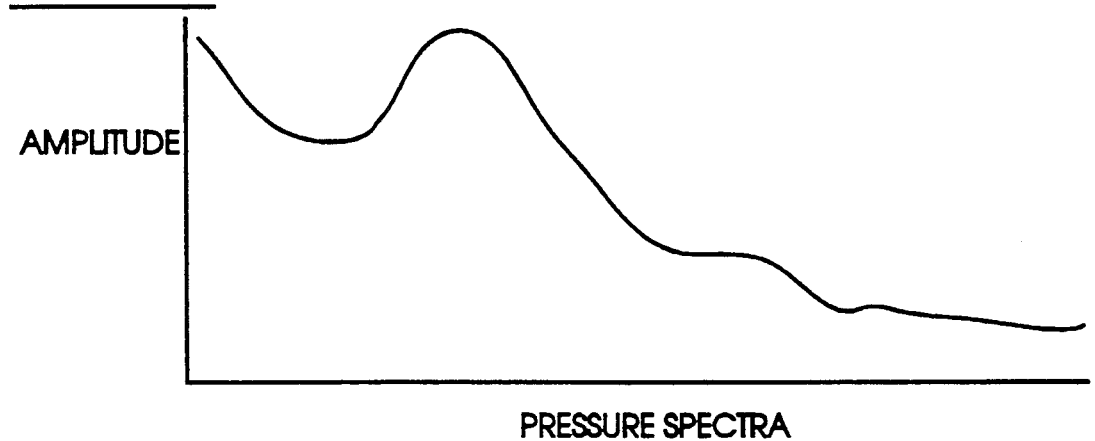
Figure 3D:
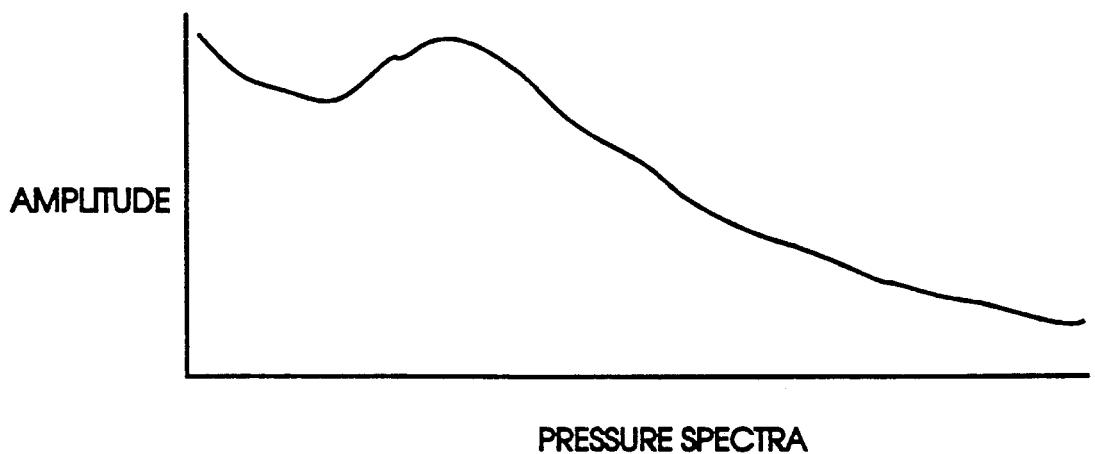
Figure 3E:
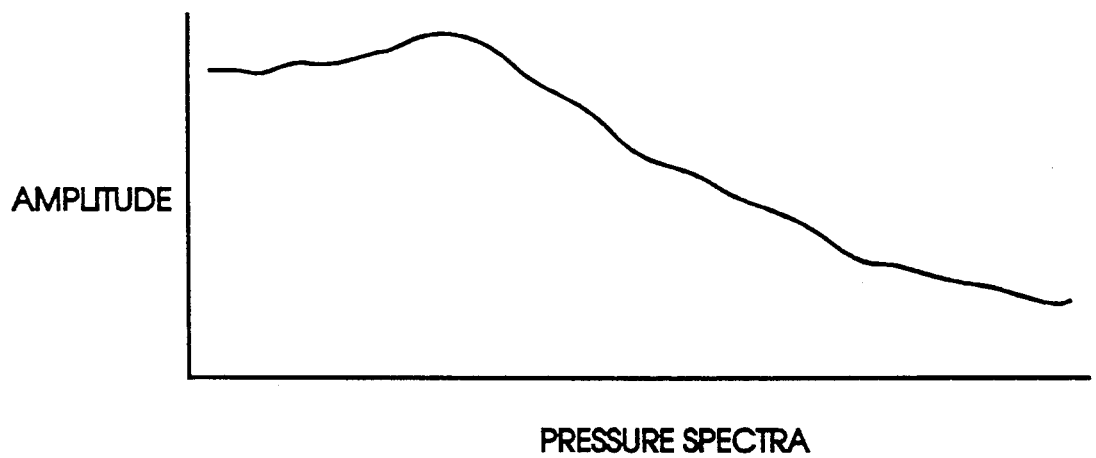
Figure 3F:
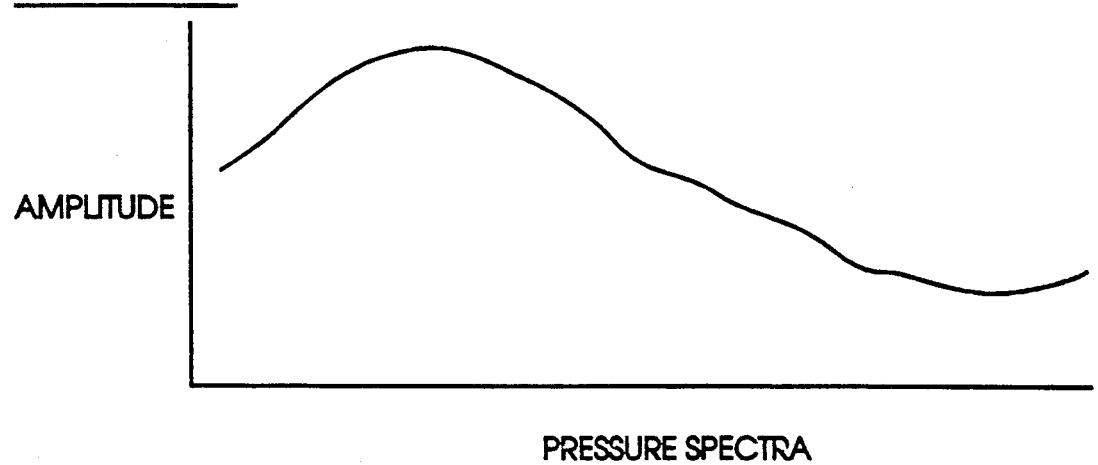

Various spectra for pressure amplitude data values collected from various sensors 20 in the transitional and turbulence zones in one embodiment are generally depicted in FIGS. 3A through 3F. Each of FIGS. 3A through 3F depicts pressure spectra based on data taken from sensors 20 ranging from those near the leading edge 11 progressively downstream, with the FIG. 3A depicting pressure spectrum based on data taken from a sensor 20 relatively near the leading edge 11 and each successively one of FIGS. 3B through 3F depicting pressure spectra based on data taken from a sensors 20 in successively downstream locations. The graph in FIG. 3A depicts pressure spectra based on data taken from a sensor in the transitional zone, and the graph in FIG. 3F depicts pressure spectra based on data taken from a sensor well into the turbulence zone. The abscissa of each graph represents frequency, with frequency increasing from left to right, and the ordinate of each graph represents a function of the normalized, windowed and smoothed Fourier coefficients (both abscissa and ordinate are represented in arbitrary units).

Figure 4:
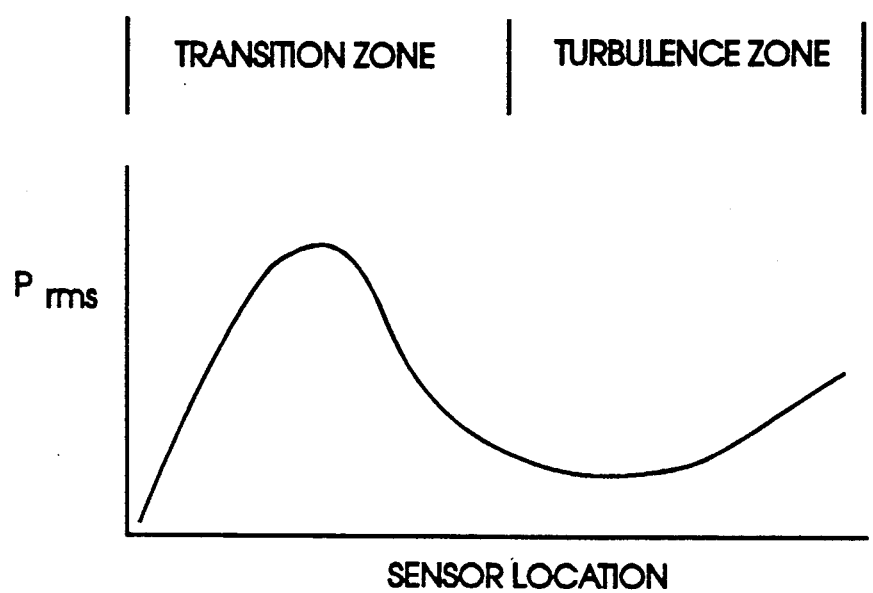
FIG. 4 depicts a value which is a measure of overall power ($P_{rms}$) as a function of such series of sensors.

Several points are evident from an examination of the series of graphs depicted in FIG. 3. First, the increase in the peak values from the top-most graph in FIG. 3A to the second graph in FIG. 3B, both of which are based on data provided by sensors 20 in the transitional zone, corresponds to observed increases in overall root-mean-square values for the spectra. The root-mean-square values, which are shown graphically in FIG. 4, are derived from the Fourier coefficients according to the relation $$P_{nms} = sqrt(|P(p_m)|^2) \quad (Eqn. 3)$$

where $|P(p_m)|^2$ is the dot product of the sequence of Fourier coefficients, considered as a vector, with itself, and "sqrt" is the square-root function. The root-mean-square value associated with the data provided by each sensor 20 provides a measure of the overall power content of the pressure fluctuations as sensed bY the sensor 20. As shown in FIC. 4, the root-mean-square values increase markedlY in the upstream portion of the transition zone, then decrease toward the turbulence zone, and increase again in the turbulence zone, although the increase in root-mean-square values in the turbulence zone is much more gradual than in the transition zone. The top two graphs in FIG. 3 in one embodiment are taken from sensors 20 in the portion of the transition zone for body 10 in which the root-mean-square values shown in FIG. 4 are increasing, and the increase in the peak values from the top graph to the second graph shown in FIG. 3 conforms to the increase in root-mean-square values shown in FIG. 4 for the associated sensors.

As a second point, broadband spectra such as are shown in the progression evident from the graphs in FIGS. 3A and 3B are common for natural transition processes even when the transition is in an early stage. This follows from two factors. First, general, broadband background disturbances are being amplified as a result of the movement of the body 10 through the fluid medium, so that lower powered pressure waves or fluctuations detected by the sensors 20 located progressively downstream but disposed toward the leading edge 11 of the body 10 are in the transition zone. The second factor is that there is little or no phase coherence in the pressure waves or fluctuations, resulting in a broadening of the frequency content of the pressure waves or fluctuations as detected by sensors located progressively downstream over the body 10.

A third observation from the power spectra curves shown in FIGS. 3A through 3F is that both the low- and high-frequencies fill in as detected by the sensors 12 located progressively downstream over the body 10. This observation follows from the fact that FIGS. 3A and 3B, for example, representing the power spectra as detected by sensors located toward the leading edge 11 of body 10 in the early transition zone, the curves have several well-defined peaks, showing that the frequency content of the waves detected by those sensors are generally well defined by the peaks. The peaks generally smooth out progressively from the curves in FIGS. 3A and 3B toward the curves in FIGS. 3E and 3F, which represent power spectra as detected by sensors 20 in the turbulence zone. The curves in FIGS. 3E and 3F, representing the spectra detected in the turbulence zone, is characterized by a broadband continuum of frequencies, of generally uniform amplitude distribution, over a wide band of frequencies.

As the Fourier coefficients which represent the power spectra are developed in step 101 for the signal generated by each sensor 20, "m"-dimensional phase portraits are also generated for each signal from the time series representation of each signal using a conventional "method-of-delays" technique (step 102). In conjunction with that operation, in one embodiment the signal is low-pass filtered and, for each time "$t_k$", a point in the phase portrait is generated defined with the coordinates:

$$[L(t_k), L(t_k+T), L(t_k+2T), L(t_k+3T), \ldots L(t_k+(m-1)T)] \quad (Eqn.\ 4)$$

where "m" is the number of dimensions of the phase portrait, "L(t)" is the amplitude of the signal received by the sensor 20 at time "t", and "T" is an arbitrarily-selected time delay (hence the name of the technique as the "method-of-delays" technique). In one particular embodiment, in which the body 10 is moving through a water medium, delay intervals of less than the period of the Tollmein-Schichting frequency was used; in particular, "T" is generally selected as a percentage of the zero-crossing of the auto-correlation function of the signals or the minimum value of the mutual information function which is consistent with the selected values.

In one particular embodiment, prior to actual generation of the actual phase portraits, the signals from the sensors 20 are low-pass filtered. In this operation, the results generated in step 101, namely, the Fourier coefficients, may be used as an input to step 102, instead of using the actual digitized temporal signal data obtained from the sensors 20 in step 100. In that operation, an inverse-Fourier transform operation is performed using only the Fourier coefficients associated with frequencies below a selected cut-off frequency to regenerate digitized temporal signal data. By ignoring the coefficients associated with frequencies above the selected cut-off frequency, those frequencies are filtered out of the temporal signal data, effectively providing low-pass filtered temporal signal data.

Figure 5A:
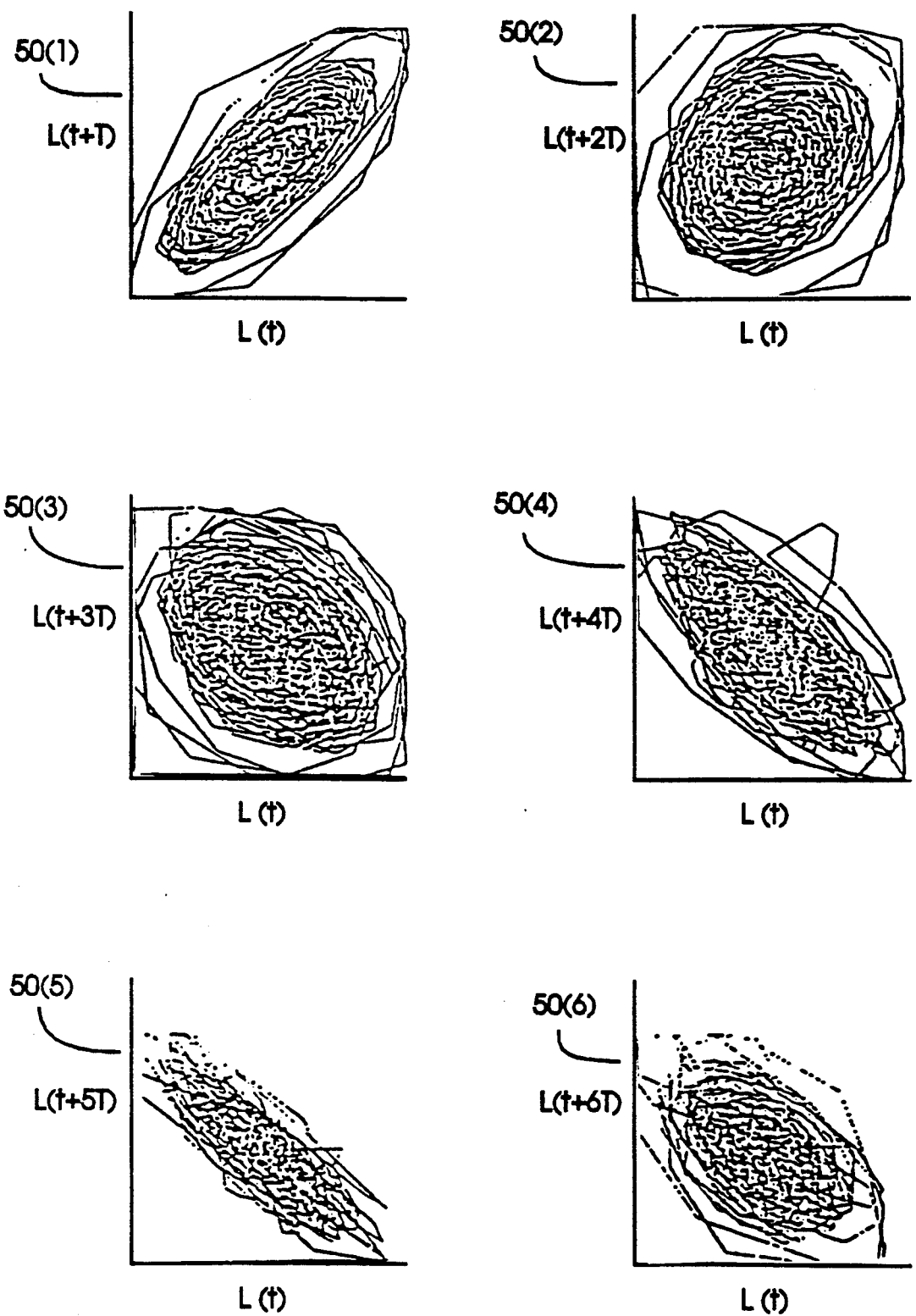
FIGS. 5A dna 5B respectively are two different families of phase portraits generated using signals from one of such series of sensors, with the individual portraits of each family representing a series of phase delay itnervals, the family of portraits of FIG. 5A being with the sensor in a transition zone and the family of portraits of FIG. 5B being with the sensor in a turbulence zone.
Figure 5B:
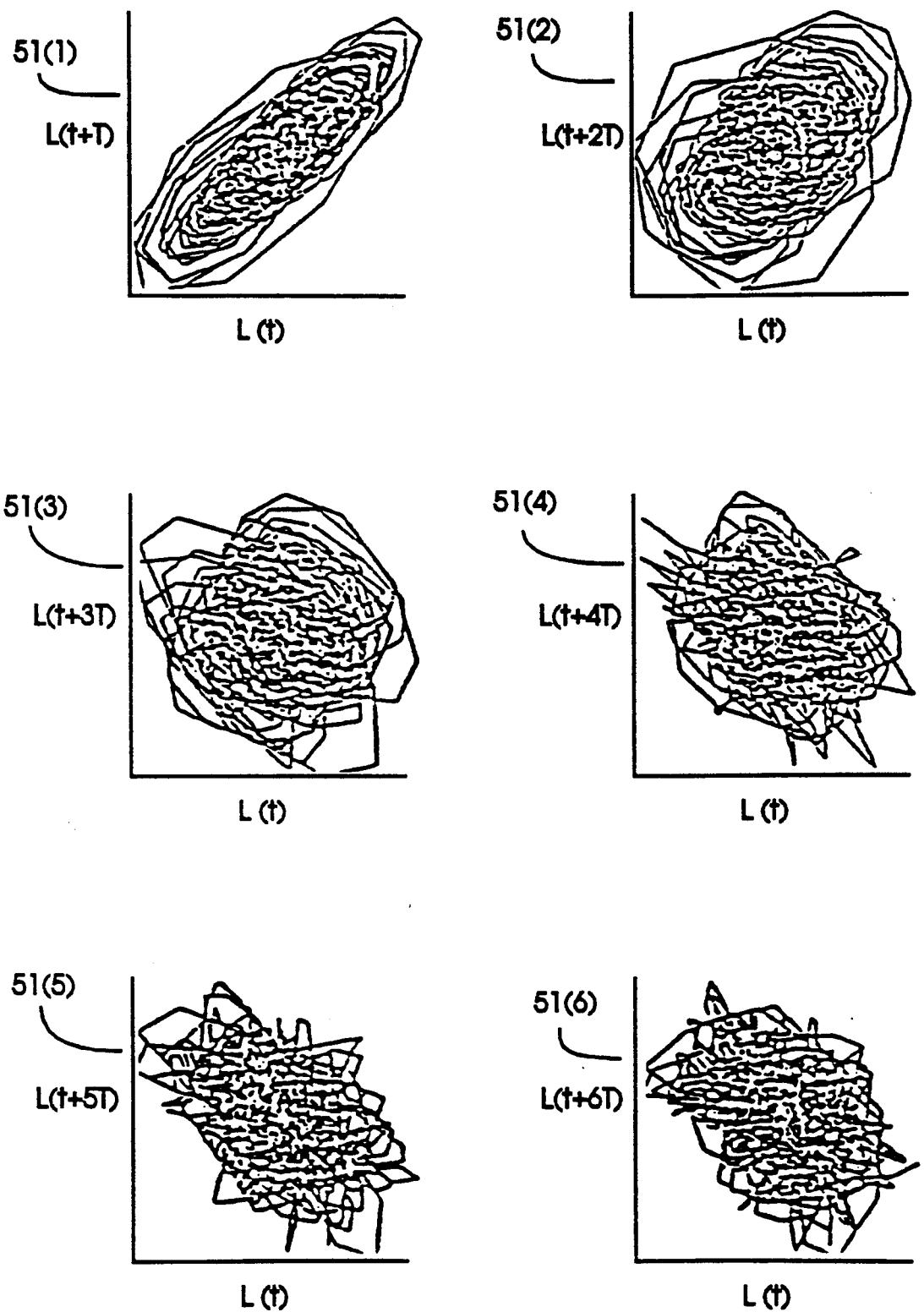

A phase portrait associated with a signal from a sensor 20 effectively represents, the time evolution of the signal. FIGS. 5A and 5B depict two-dimensional phase portraits generated from one embodiment of the invention, FIG. 5A being associated with a signal from a sensor 20 in the transition zone, and FIG. 5B being associated with a signal from a sensor 20 in the turbulence zone. Each figure includes six phase portraits, each of an incrementally lon9er delay parameter, that is of incrementally-longer time lag. Thus, FIG. 5A includes phase portraits 50(1) through 50(6), which are symbolically identified 4. in this text by reference numeral 50(i), with each phase portrait 50(i) representing a delay parameter, or time lag, "T" (from equation Eqn. 4) corresponding to a time interval proportional to the index "i." Similarly, FIG. 5B includes phase portraits 51(1) through 51(6), which are in a similar manner symbolically identified by reference numeral 5i(i). In both FIGS. 5A and 5B, in the phase portraits whose index "i" equals 1 [that is, in both phase portraits 50(1) and 51(1)] the delay parameter "T" used corresponds to one sampling period used by the sensor 20 to generate the pressure amplitude data values p(t) used in generating the phase portrait. In one embodiment "T" corresponds to a time period of on the order of a tenth of a millisecond.

Each phase portrait geometrically portrays the evolutionary dynamics of the associated signal without any temporal averaging or processing (except for that which may be performed by low-pass filtering of the signals) and showing non-linear coupling of the dynamics and inherent phase relationships up to the dimensional order of the embedded signal. FIG. 5A depicts six (6) phase portraits 50(1), 50(2), 50(3), 50(4) and 50(5) and 50(6). The phase portrait 50(1) exhibits a high correlation of measured signal levels at a delay interval corresponding to the sampling period of the sensor. It will be appreciated that phase portrait 50(1) is generally ellipsoidal in shape, with the major axis of the ellipse lying at approximately a forty-five degree angle to the horizontal [L(t)] axis, and the minor axis being orthogonal to the major axis. Phase portrait 50(2), which is generated using a delay interval twice that used in phase portrait 50(1), is expanded somewhat along the minor axis (becoming more circular in shape, with a reduction in the ratio of major axis length to minor axis length) from the phase portrait 50(1). The next phase portrait 50(3) was generated using a delay interval thrice that used in phase portrait 50(1), and it shows a further expansion along the direction of the minor axis of phase portrait 50(1). Indeed, phase portrait 50(3) becomes an ellipsoid whose major axis corresponds to the minor axis of phase portrait 50(1).

Phase portraits 50(4) and 50(5), generated using stepwise progressively longer delay intervals, show progressive flattening of the ellipses, with increases of the ratios of major axis lengths to minor axis lengths. Phase portrait 50(6) generated using a step-wise longer delay interval than that used for phase portrait 50(5), tends to show a broadening of the minor axis from the phase portrait 50(5). Phase portraits (not shown) generated using successive step wise longer delays would be expected to show a further expansion along the minor axes, with eventual return to the orientation of phase portrait 50(1). It should be noted that the ellipsoidal shape is generally reflective of the fact that the time delay "T" is a multiple of one-half wavelength of the T-S waves in early transition, and the well-formed ellipsoidal shapes generally reflect the fact that the pressure fluctuations detected by the sensor 20 are generally of well defined frequencies, which conforms to the shapes of the power spectra graphs in the transition zone as shown in, for example, FIGS. 3A and 3B.

The phase portraits 51(1) through 51(6) in FIG. 5B were generated using a signal from a sensor 20 in the turbulence zone at the same delay intervals of the correspondingly-indexed phase portraits 50(1) through 50(6) in FIG. 5A. It should be noted that the generally-ellipsoidal shapes of the phase portrait 51(1) through 51(6) generally suggests a persistence of the T-S wave in the turbulence region which is not as readily apparent from the power spectra shown in, for example, FIGS. 3E and 3F.

After obtaining the phase portraits (FIGS. 5A and 5B) in step 102 during the reference stage, the body 10 may be used in an operational stage, and the results generated during the reference stage may be used to detect the onset of turbulence about the body 10. With further reference to FIG. 2, in the operation mode, the sensors 20 generate operational sets of temporal pressure data in the same way as during the reference stage (step 103). The operational temporal pressure data is filtered (step 104) in the same way as in step 101, and method-of-delay phase portraits are generated (step 105), again in the same way as during the reference stage (specifically step 102).

The phase portraits generated during the operational stage are examined and compared to corresponding phase portraits generated during the reference stage to determine whether turbulence has been established in the fluid medium around the body 10 (step 106). In this operation, visual comparisons may be made of phase portraits based on the operational temporal pressure data with phase portraits of corresponding delay intervals generated during the reference stage and likely presence of turbulence detected from similarities in shape of phase portraits of corresponding time delays, or alternatively comparisons may be numerically computed. Stated another way, what criterion is being used for visual or numerical detection of onset of turbulence is the presence of charaoteristics of the method-of-delay phase portraits associated with presence of turbulence discussed hereinbefore. The comparison may be performed visually, or alternatively pattern matching apparatus, such as a suitably trained neural network, may be used in making the comparison.

The operations described in connection with steps 103 through 106 may be performed iteratively, to facilitate the detection of onset of turbulence.

An expanded description of the theoretical basis of the foregoing may be found in Ricard A. Katz, "Transitions to Turbulence: Determinism in Nature", a dissertation in the Division of Applied Mathematics, Brown University, Providence, R. I., which was published on May 15, 1993 and which is hereby incorporated by reference.

The new method provides a number of advantages. In particular, it provides a relatively inexpensive and very reliable method for detecting the onset of turbulence in a fluid medium caused by a body moving in the medium.

It will be appreciated that the reliability of the method 4. may be somewhat limited by noise which may be produced by, for example, sources of vibration internal to the body, such as engines which may be used to power the body 10 through the fluid medium. It may be advantageous, prior to beginning the use of the method, to obtain a power spectrum of such sources at each of the sensors 20, which may be used to process the data obtained from the sensors after the data is acquired, but prior to performing steps 101 and 102 in the reference stage or steps 104 through 106 in the operational stage.

It will be appreciated by those skilled in the art that some or all of the inventive method may be performed using suitably programmed digital computing equipment, or special-purpose hardware.

The foregoing description has been given for a specific illustrative embodiment of this invention, but the scope of the invention is not limited to the illustrative embodiment described herein. In general, the invention will be applicable to similar flow geometries and dynamics as for the described embodiment. It will be further apparent that various variations and modifications may be made to the invention, with the attainment of some or all of the advantages of the invention. It is the object of the appended claims to cover these and such other variations and modifications as come within the true spirit and scope of the invention.

What is claimed is:

1. A method of detecting the onset of turbulence in connection with a body moving through a fluid medium comprising the steps of:

supplying in the sidewall of the body, in at least a region of the body in which turbulence is expected to occur, sensors each for generating a signal suitable for measuring amplitude of pressure fluctuations of the medium proximate a region of said sidewall;

during a reference stage during which the body moves through the fluid medium when it is known that turbulence is occurring around at least a portion of said body, (i) enabling the sensors to each generate reference temporal pressure data representing fluctuations in pressure of the fluid medium around said body, and (ii) generating, in response to reference temporal pressure data generated by sensors in a turbulence zone at which turbulence is occurring and sensors in a transition zone between the turbulence zone and a laminar flow zone, a method-of-delay phase portrait for each of a progression of selected delay interval,s; and during an operational stage during which the body moves through the fluid medium, (i) enabling the sensors to each generate operational temporal pressure data representing fluctuations in pressure of the fluid medium around said body, and generating in response a method-of-delay phase portrait for each of a progression of selected delay intervals, and (ii) comparing the phase portraits, for corresponding ones of said selected delay intervals, generated in response to the operational temporal pressure data during the operational stage to phase portraits generated in response to the reference temporal pressure data from the transitional zone and the turbulence zone to determine whether the phase portraits generated in response to the operational temporal pressure data have selected characteristics present in the phase portraits generated in response to the reference temporal pressure data from the transitional zone and the turbulence zone.

2. A method as defined in claim 1 further including the steps of low-pass filtering said reference temporal pressure data and said operational temporal pressure data prior to generating respective phase portraits.

3. A method as defined in claim 2 in which low-pass filtering of said reference temporal pressure data is accomplished according to the steps of:
performing a Fourier transform operation in connection with said reference temporal pressure data to generate a set of Fourier coefficients each associated with a frequency;
eliminating from said set of Fourier coefficients, those of said Fourier coefficients associated with frequencies above a predetermined cut-off frequency; and
performing an inverse Fourier transform operation in connection with remaining Fourier coefficients in said set of Fourier coefficients.

4. A method as defined in claim 2 in which low-pass filtering of said operational temporal pressure data is accomplished according to the steps of:
performing a Fourier transform operation in connection with said operational temporal pressure data to generate a set of Fourier coefficients each associated with a frequency;
eliminating from said set of Fourier coefficients, those of said Fourier coefficients associated with frequencies above a predetermined cut-off frequency; and
performing an inverse Fourier transform operation in connection with remaining Fourier coefficients in said set of Fourier coefficients.

5. A method as defined in claim 2 in which low-pass filtering of said reference temporal pressure data and of said operational temporal pressure data are both accomplished according to the steps of:
performing Fourier transform operations in connection with said reference temporal pressure data and said operational temporal pressure data to generate respective sets of Fourier coefficients each associated with a frequency;
eliminating from said respective sets of Fourier coefficients, those of said Fourier coefficients associated with frequencies above a predetermined cut-off frequency; and
performing inverse Fourier transform operations in connection with remaining Fourier coefficients in said set of Fourier coefficients.

6. A method as defined in claim 5 in which said respective sets of Fourier coefficients are further used to generate power spectra, said turbulence onset determination further being made in response to a comparison of said power spectra generated in response to (i) said reference temporal pressure data from sensors in said turbulence zone and sensors in said transition zone, and (ii) said operational temporal pressure data.

7. A system for detecting the onset of turbulence in connection with a body moving through a fluid medium, the sidewall of the body, in at least a region of the body in which turbulence is expected to occur, including sensors each for generating a signal suitable for measuring amplitude of pressure fluctuations of the medium proximate a region of said sidewall, said system including:
first and second means operative during a reference stage during which the body moves through the fluid medium when it is known that turbulence is occurring around at least a portion of said body, said first means being operative to enable the sensors to each generate reference temporal pressure data representing fluctuations in pressure of the fluid medium around said body, said second means being operative to generate in response to reference temporal pressure data generated by sensors in a turbulence zone at which turbulence is occurring and sensors in a transition zone between the turbulence zone and a laminar flow zone, a method-of-delay phase portrait for each of a progression of selected delay intervals;
third means operative during an operational stage during which the body moves through the fluid medium for enabling the sensors to each generate operational temporal pressure data representing fluctuations in pressure of the fluid medium around said body, and generating in response a method-of-delay phase portrait for each of a progression of selected delay intervals; and
fourth means operative during the operational stage for comparing the phase portraits, for corresponding ones of said selected delay intervals, generated in response to the operational temporal pressure data during the operational stage to phase portraits generated in response to the reference temporal pressure data from the transitional zone and the turbulence zone to determine whether the phase portraits generated in response to the operational temporal pressure data have selected characteristics present in the phase portraits generated in response to the reference temporal pressure data from the transitional zone and the turbulence zone.

* * * * *